(12) United States Patent
Walker et al.

(10) Patent No.: US 12,352,066 B2
(45) Date of Patent: Jul. 8, 2025

(54) RAILING SYSTEMS AND BRACKETS FOR SAME

(71) Applicant: Peak Innovations Inc., Richmond (CA)

(72) Inventors: Simon Walker, Delta (CA); Craig Lawson, Burnaby (CA); Charles Young, Vancouver (CA); Adam Mantei, Burnaby (CA)

(73) Assignee: PEAK INNOVATIONS INC., Richmond (CA)

( * ) Notice: Subject to any disclaimer, the term of this patent is extended or adjusted under 35 U.S.C. 154(b) by 421 days.

(21) Appl. No.: 17/801,493

(22) PCT Filed: Mar. 24, 2021

(86) PCT No.: PCT/CA2021/050384
§ 371 (c)(1),
(2) Date: Aug. 22, 2022

(87) PCT Pub. No.: WO2021/189140
PCT Pub. Date: Sep. 30, 2021

(65) Prior Publication Data
US 2023/0160229 A1 May 25, 2023

Related U.S. Application Data

(60) Provisional application No. 62/993,886, filed on Mar. 24, 2020.

(51) Int. Cl.
*E04H 17/24* (2006.01)
*E04H 17/14* (2006.01)

(52) U.S. Cl.
CPC ......... *E04H 17/24* (2013.01); *E04H 17/1426* (2013.01)

(58) Field of Classification Search
CPC ... E04H 17/013; E04H 17/14; E04H 17/1413; E04H 17/1417; E04H 17/1426;
(Continued)

(56) References Cited

U.S. PATENT DOCUMENTS 3,092,407 A * 6/1963 Blonder .................... F16B 2/08
256/65.05
5,653,546 A * 8/1997 Cronkhite ........... E04H 17/1413
403/123
(Continued)

FOREIGN PATENT DOCUMENTS

CN 202214922 U 5/2012
KR 20120120883 A * 11/2012
(Continued)

*Primary Examiner* — Jonathan P Masinick
(74) *Attorney, Agent, or Firm* — Oyen, Wiggs, Green & Mutala LLP

(57) ABSTRACT

A railing system comprises first and second rails, a post, a first bracket and a second bracket. The first bracket connects the first rail to the post and comprises a first plate, a first pivot member, a first receiving portion, and a first base. The first receiving portion and the first base are adapted to pivot about a longitudinal axis of the first pivot member. The second bracket connects the second rail to the post, and comprises a second plate, a second pivot member, a second receiving portion, and a pin. The second receiving portion is adapted to pivot about a longitudinal axis of the second pivot member.

22 Claims, 11 Drawing Sheets

(58) Field of Classification Search
CPC ............ E04H 17/1447; E04H 17/1448; E04H 17/1488; E06B 11/02; E06B 11/22
See application file for complete search history.

(56) References Cited

U.S. PATENT DOCUMENTS

| | | | |
|---|---|---|---|
| 9,151,074 B2* | 10/2015 | Walters | ............... E04H 17/1448 |
| 10,450,773 B2* | 10/2019 | Wade-Smith | ........ E04H 17/1448 |
| 10,808,417 B2* | 10/2020 | Gooden | ................... E04H 17/18 |
| 10,876,727 B1* | 12/2020 | Xi | .............................. F21S 4/28 |
| 11,136,764 B2* | 10/2021 | Leary | ................... E04F 11/1836 |
| 2006/0033093 A1* | 2/2006 | Lo | ........................ E04H 17/1448 |
| | | | 256/65.02 |
| 2006/0226330 A1 | 10/2006 | Yu | |
| 2009/0200532 A1* | 8/2009 | Platt | .................... E04F 11/1834 |
| | | | 256/67 |
| 2013/0175488 A1 | 7/2013 | Burt et al. | |
| 2015/0123061 A1 | 5/2015 | Walters | |
| 2015/0247342 A1 | 9/2015 | Honein | |
| 2022/0290437 A1* | 9/2022 | Walker | .................... E04F 11/18 |

FOREIGN PATENT DOCUMENTS

| | | | |
|---|---|---|---|
| KR | 101278582 B1 * | 6/2013 | |
| KR | 101302070 B1 * | 9/2013 | |
| KR | 101345989 B1 * | 12/2013 | |
| KR | 101490492 B1 * | 2/2015 | |
| KR | 101588302 B1 | 1/2016 | |
| KR | 101952924 B1 | 2/2019 | |
| KR | 101991026 B1 | 6/2019 | |

* cited by examiner

RAILING SYSTEMS AND BRACKETS FOR SAME

FIELD OF THE INVENTION

The present invention relates to railing systems, and in particular, to brackets for use with railing systems.

BACKGROUND OF THE INVENTION

Railing systems for any number of outdoor applications are well known. For example, residential decks, pool decks, and playgrounds all utilize any number of conventional railing systems. Such railing systems typically comprise top and bottom longitudinal rails, with a number of vertical pickets spanning between the rails.

Brackets are typically used to connect the rails to the posts. For example, the post may comprise surfaces on opposite faces on which the brackets may be attached. This would generally be appropriate when the rails that are attached to the post are colinear with each other. However, when the railing system involves rails and posts that are not aligned either colinearly (or orthogonally) to each other, it may be difficult to securely attach the rails to the posts using conventional brackets. For example, when two rail extends from the post at an angle to each other, the brackets used to connect the rails to the post may need to account for the angularity of the rails. Because the angle may differ from case to case, different brackets with different, predetermined angles may be used. However, where the actual angle of the rails and the post does not match one the predetermined angles, the fit between the post, the bracket, and the rails may not be ideal.

Therefore, it is desirable for an improved railing system for use with rails that extend from posts at different angles.

SUMMARY OF THE INVENTION

In one embodiment of the invention, a railing comprises first and second rails, one or more posts, a first bracket connecting the first rail to one of the posts, and a second bracket connecting the second rail to one of the posts. Each of the posts comprises a post surface. The first bracket comprises a first plate, a first pivot member, a first receiving portion, and a first base. The first plate is adapted to be attached to the post surface. The first pivot member extends from and is attached to the first plate. The first pivot member comprises first upper and lower surfaces, with the first upper surface comprising a first upper opening and the first lower surface comprising a first lower opening. The first upper opening and the first lower opening are aligned. The first receiving portion is adapted to receive one end of the first rail, with the first receiving portion comprising first sidewalls and a first cover. The first cover comprises a first cover protrusion adapted to engage with the first upper opening. The first base is connected to the first receiving portion, with the first base comprising a first base protrusion adapted to engage with the first lower opening. The first receiving portion and the first base are adapted to pivot about a longitudinal axis of the first pivot member to adjust a first angle between the first rail and the post surface. The second bracket comprises a second plate, a second pivot member, a second receiving portion, and a pin. The second plate is adapted to be attached to the post surface. The second pivot member extends from and is attached to the second plate. The second pivot member comprises second upper and lower surfaces, with the second upper surface comprising a second upper opening and the second lower surface comprising a second lower opening. The second receiving portion is adapted to receive one end of the second rail. The second receiving portion comprises second sidewalls, a second cover, and a second base. The second cover comprises a second cover opening and the second base comprises a second base opening. The second cover opening, the second upper opening, the second base opening, and the second lower opening are substantially aligned. The pin extends through the second cover opening, the second upper opening, the second base opening, and the second lower opening. The second receiving portion is adapted to pivot about a longitudinal axis of the second pivot member to adjust a second angle between the second rail and the post surface.

In another embodiment, the first plate comprises one or more first plate openings adapted to receive first post fasteners therethrough for attaching the first plate to the post surface.

In yet another embodiment, the second plate comprises one or more second plate openings adapted to receive second post fasteners therethrough for attaching the second plate to the post surface.

In a further embodiment, the first upper opening and the first lower opening are circular in shape.

In still yet another embodiment, the second cover opening, the second upper opening, the second base opening, and the second lower opening are circular in shape.

In yet another embodiment, the first cover protrusion extends downwardly and fits within the first upper opening.

In still yet another embodiment, the first base protrusion extends upwardly and fits within the first lower opening.

In another embodiment, each of the first sidewalls comprise two sidewall portions, with the two sidewall portions angled with respect to each other.

In yet another embodiment, the first receiving portion further comprises first lower members extending from the first sidewalls, with the first lower members comprising first lower member openings adapted to receive first rail fasteners therethrough for attaching the first receiving member to the first rail.

In still yet another embodiment, the first receiving portion further comprises a first support portion extending between the first lower members.

In a further embodiment, the first base is connected to the first support portion.

In still a further embodiment, the first sidewalls, the first cover, and the first lower members are adapted to receive the one end of the first rail.

In still yet a further embodiment, the first pivot member comprises a first channel extending therethrough, with the first channel providing access to at least one of the first plate openings.

In yet a further embodiment, the second receiving portion further comprises a second lower member, with the second sidewalls and the second lower member adapted to receive the one end of the second rail.

In still a further embodiment, the second receiving portion further comprises a wall, with the wall extending substantially perpendicularly to the second sidewalls and with the wall extending between the second base and the second lower member.

In still yet a further embodiment, the second pivot member comprises a second channel extending therethrough, with the second channel providing access to at least one of the second plate openings.

In a further embodiment, the wall comprises a wall opening, with the wall opening being at least partially aligned with the second channel to provide access to at least one of the second plate openings.

In still a further embodiment, the first angle and the second angle are substantially similar.

In another embodiment, a bracket is provided for connecting a rail to a post surface. The bracket comprises a plate, a pivot member, a receiving portion, and a base. The plate is adapted to be attached to the post surface. The pivot member extends from and is attached to the plate, with the pivot member comprising upper and lower surfaces. The upper surface comprises an upper opening and the lower surface comprises a lower opening. The upper opening and the lower opening are aligned. The receiving portion is adapted to receive the rail, with the receiving portion comprising sidewalls and a cover. The cover comprises a cover protrusion adapted to engage with the upper opening. The base is connected to the receiving portion, with the base comprising a base protrusion adapted to engage with the lower opening. The receiving portion and the base are adapted to pivot about a longitudinal axis of the pivot member to adjust an angle between the rail and the post surface.

In still another embodiment, a bracket is provided for connecting a rail to a post surface. The bracket comprises a plate, a pivot member, a receiving portion, and a pin. The plate is adapted to be attached to the post surface. The pivot member extends from and is attached to the plate, with the pivot member comprising upper and lower surfaces. The upper surface comprises an upper opening and the lower surface comprises a lower opening. The receiving portion is adapted to receive the rail, with the receiving portion comprising sidewalls, a cover, and a base. The cover comprises a cover opening and the base comprises a base opening. The cover opening, the upper opening, the base opening, and the lower opening are substantially aligned. The pin extends through the cover opening, the upper opening, the base opening, and the lower opening. The receiving portion is adapted to pivot about a longitudinal axis of the pivot member to adjust an angle between the rail and the post surface.

The foregoing was intended as a summary only and of only some of the aspects of the invention. It was not intended to define the limits or requirements of the invention. Other aspects of the invention will be appreciated by reference to the detailed description of the preferred embodiments.

BRIEF DESCRIPTION OF THE DRAWINGS

The embodiments of the invention will be described by reference to the drawings thereof, in which.

DETAILED DESCRIPTION OF THE INVENTION

Figure 1:
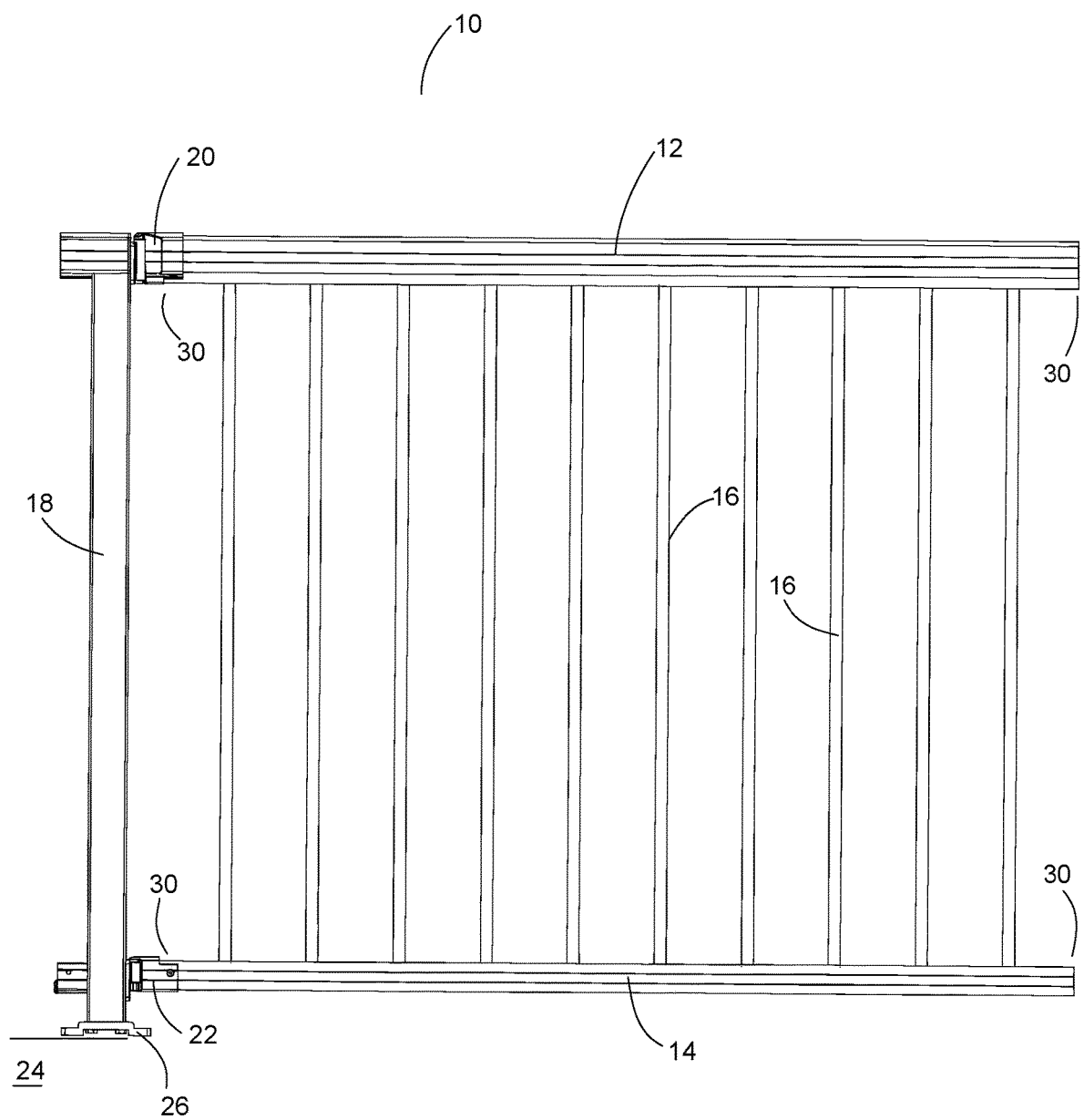
FIG. 1 shows the railing system in accordance with the invention.
Figure 2:
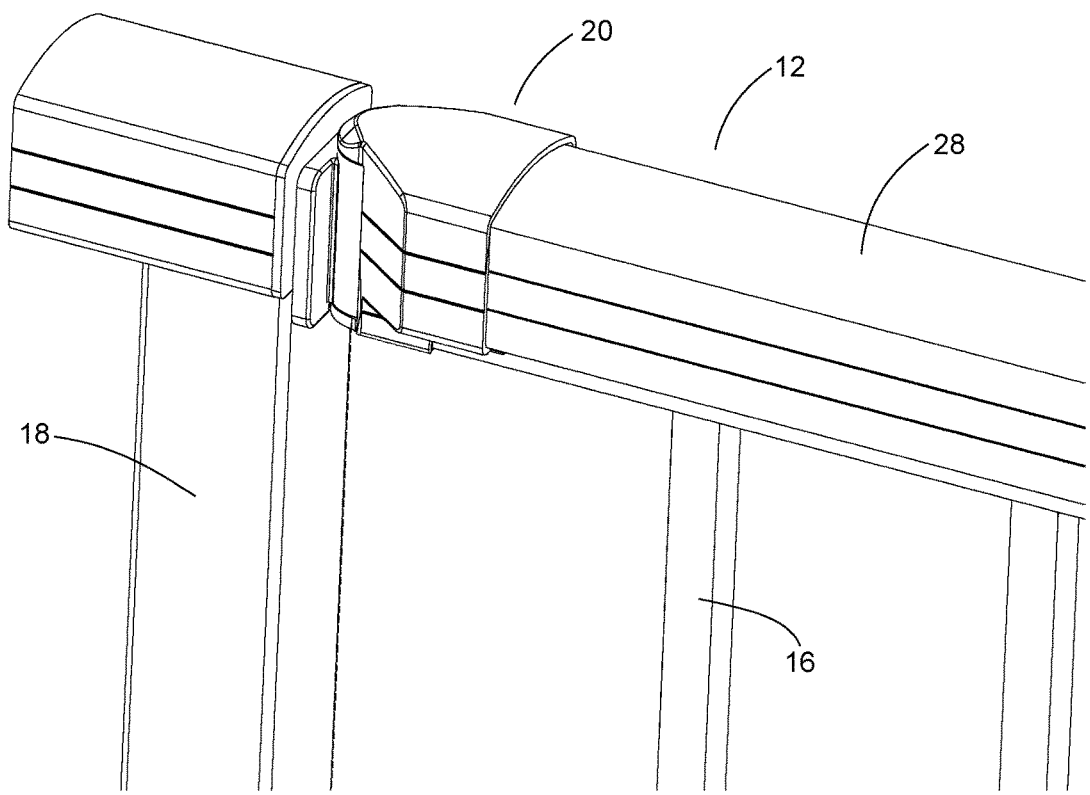
FIG. 2 is a magnified view of a portion of the railing system of FIG. 1, depicting, among other things, the first bracket.
Figure 3:
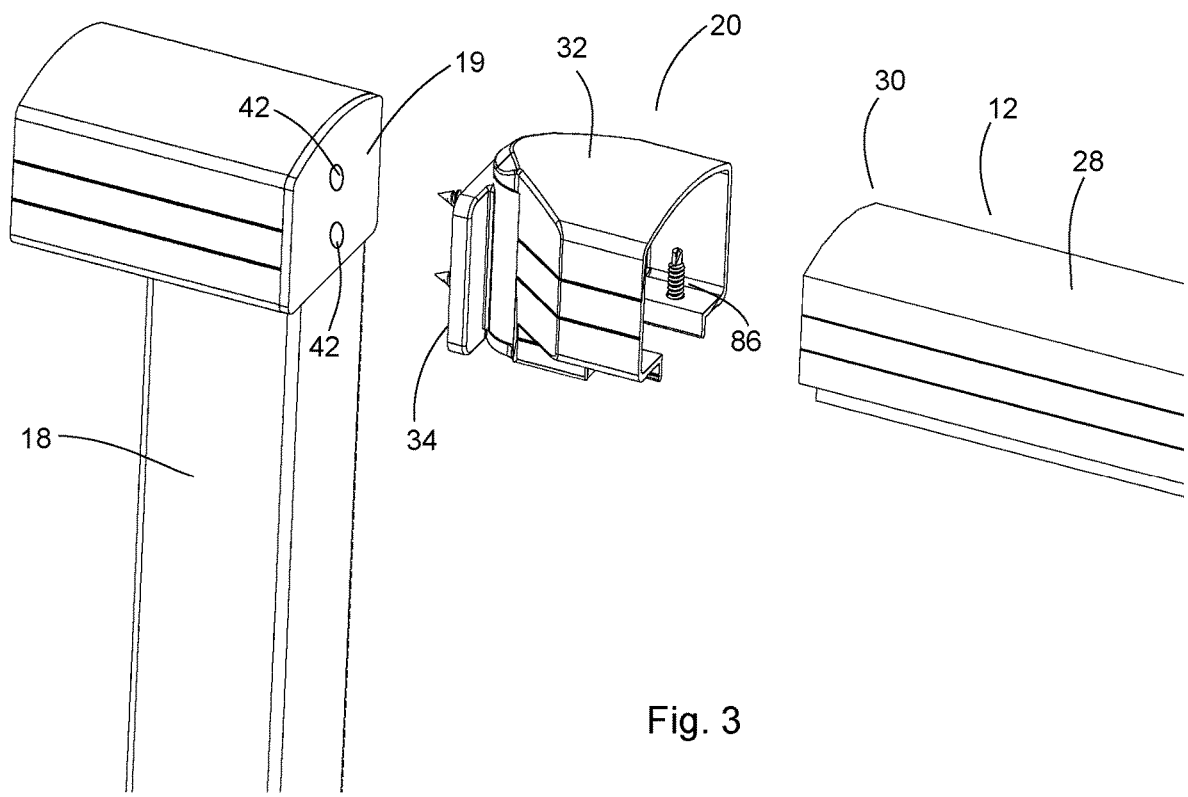
FIG. 3 is an exploded view of the portion of the railing system shown in FIG. 2.
Figure 4:
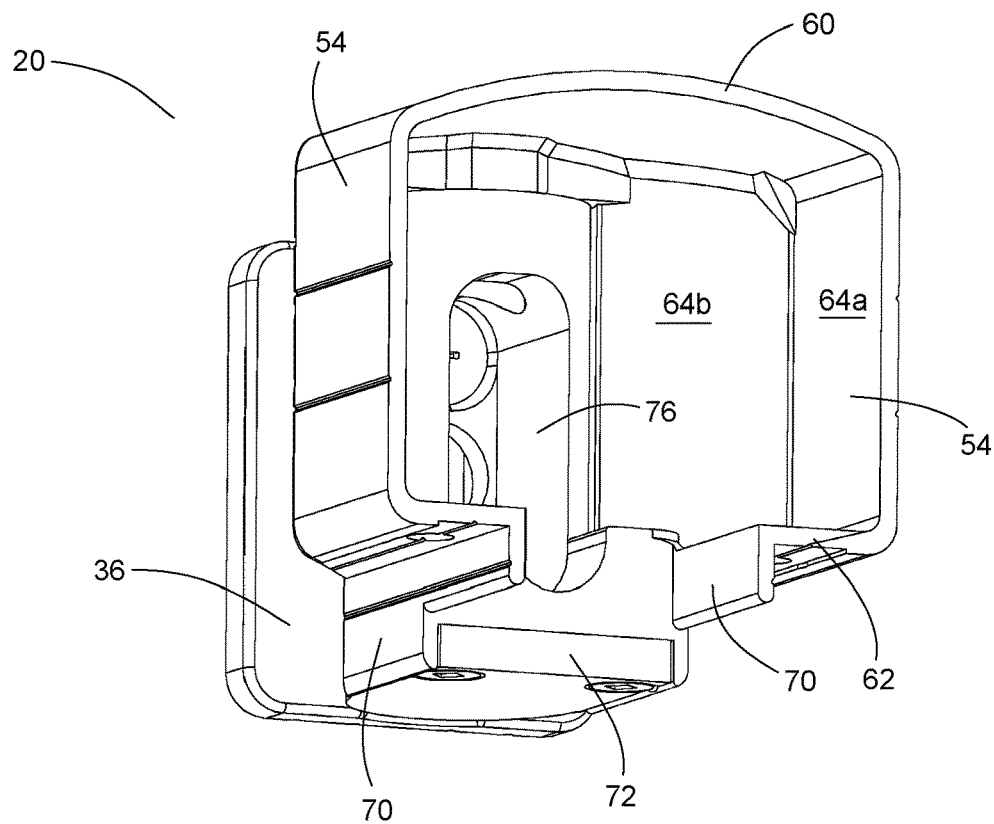
FIG. 4 is a perspective view of the first bracket of FIG. 2.

Referring to FIG. 1, a railing system 10 in accordance with the present invention is generally shown. The railing system 10 comprises an elongated first rail 12, an elongated second rail 14, and a plurality of pickets 16 extending between the first rail 12 and the second rail 14. The first and second rails 12, 14 are attached to a post 18 using first and second brackets 20, 22, respectively. The post 18 is preferably oriented substantially vertically and may be secured to a surface 24 using a post base 26. The post 18 comprises a post surface 19 for engaging with the first and second brackets 20, 22.

The pickets 16 are placed substantially parallel to each other in a spaced arrangement. Preferably, the first and second rails 12, 14 are substantially parallel to each other. The first rail 12 may comprise a contoured first rail surface 28 that is adapted for gripping by the user. The first and second rails 12, 14 comprise rail ends 30 that engage with the first and second brackets 20, 22.

Referring to FIGS. 2 to 12, the first bracket 20 comprises a first receiving portion 32 adapted to receive and engage one of the rail ends 30 of the first rail 12. The first bracket 20 also comprises a first post attachment portion 34 adapted to be attached to the post 18. The first post attachment portion 34 comprises a first plate 36 that engages with the post surface 19. The first plate 36 preferably comprises one or more first plate openings 38 that are adapted to receive first post fasteners 40 therethrough for securing the first bracket 20 to the post surface 19. The post surface 19 may comprise one or more post openings 42 that are aligned with the first plate openings 38 and that are also adapted to receive the first post fasteners 40 therethrough. The first post fasteners 40 may comprise bolts, screws, or the like.

Figure 6:
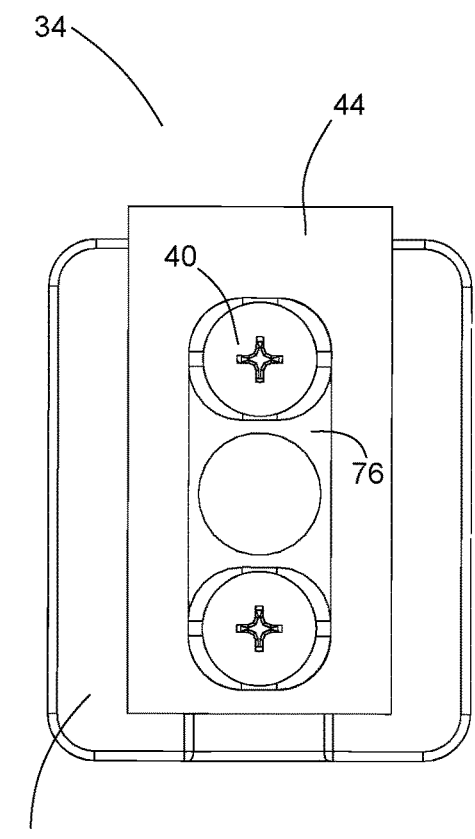
FIG. 6 is a front view of the first post attachment portion of the first bracket.
Figure 7:
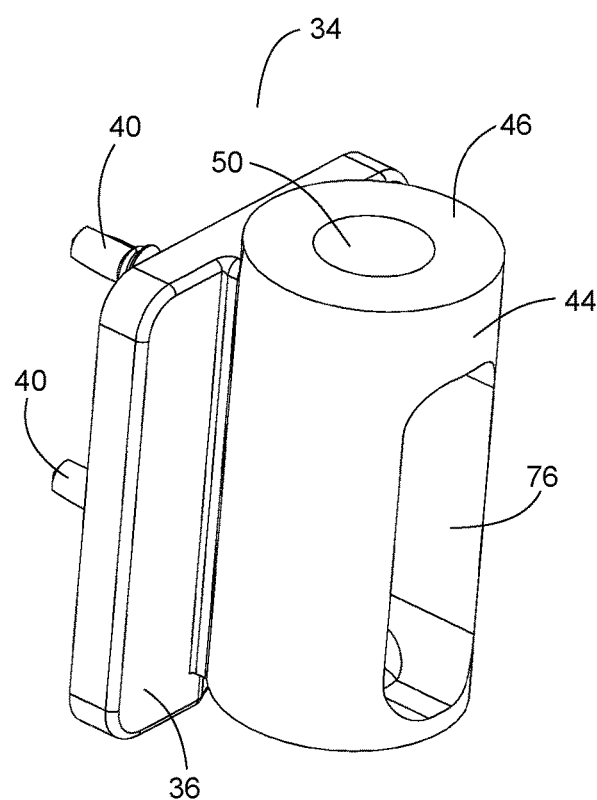
FIG. 7 is a perspective view of the first post attachment portion of FIG. 6.
Figure 8:
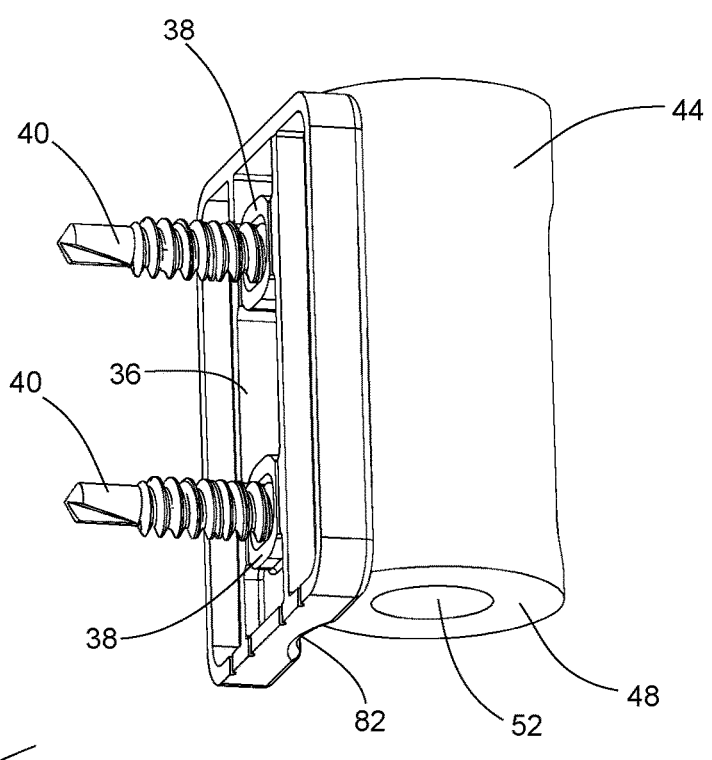
FIG. 8 is another perspective view of the first post attachment portion of FIG. 6.

Referring to FIGS. 6 to 8, the first post attachment portion 34 also comprises a first pivot member 44 extending from the first plate 36. Preferably, the first pivot member 44 is rigidly attached to the first plate 36. The first pivot member 44 may be generally tubular in shape and comprises first upper and first lower surfaces 46, 48. A first upper opening 50 is formed on the first upper surface 46, while a first lower opening 52 is formed on the first lower surface 48. The first upper and lower openings 50, 52 are preferably substantially circular in shape and are preferably aligned with each other. The first pivot member 44 provides a base from which the first receiving portion 32 may pivot with respect to the first post attachment portion 34.

Figure 9:
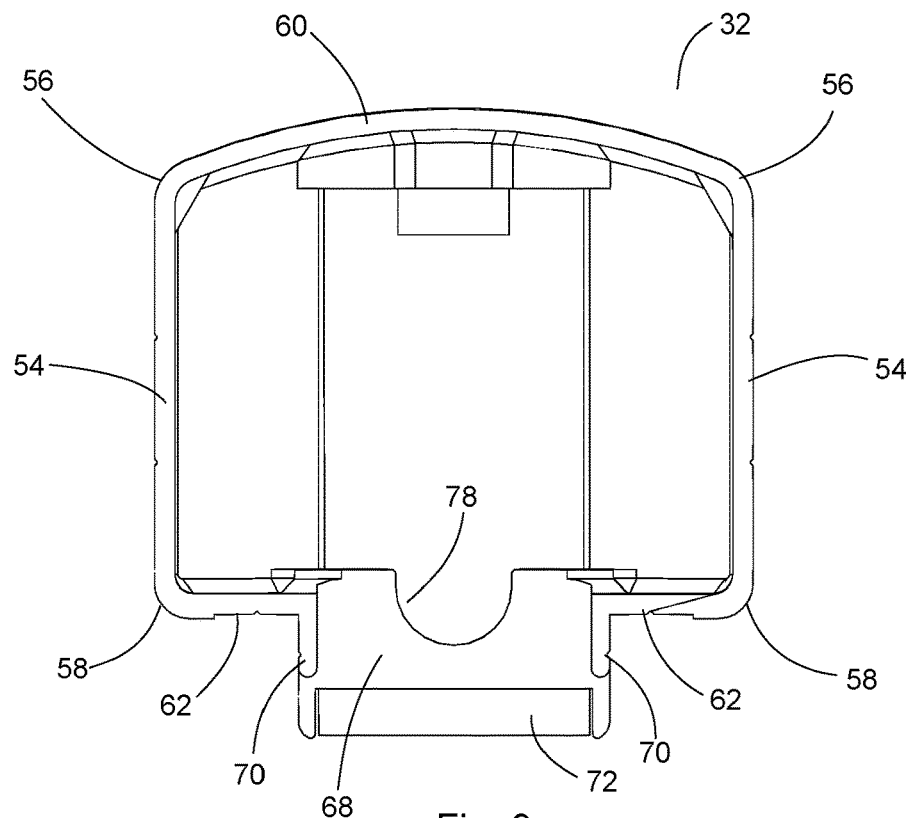
FIG. 9 is a front view of the first receiving portion and the first base of the first bracket.
Figure 10:
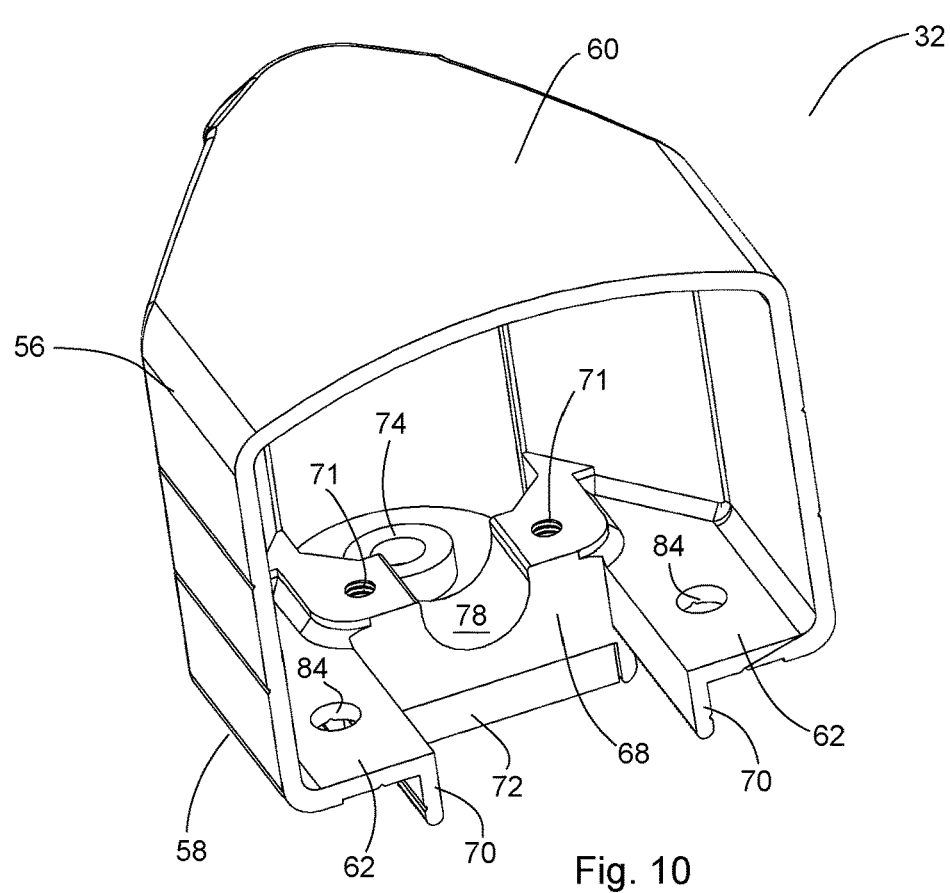
FIG. 10 is a perspective view of the first receiving portion and the first base of FIG. 9.
Figure 11:
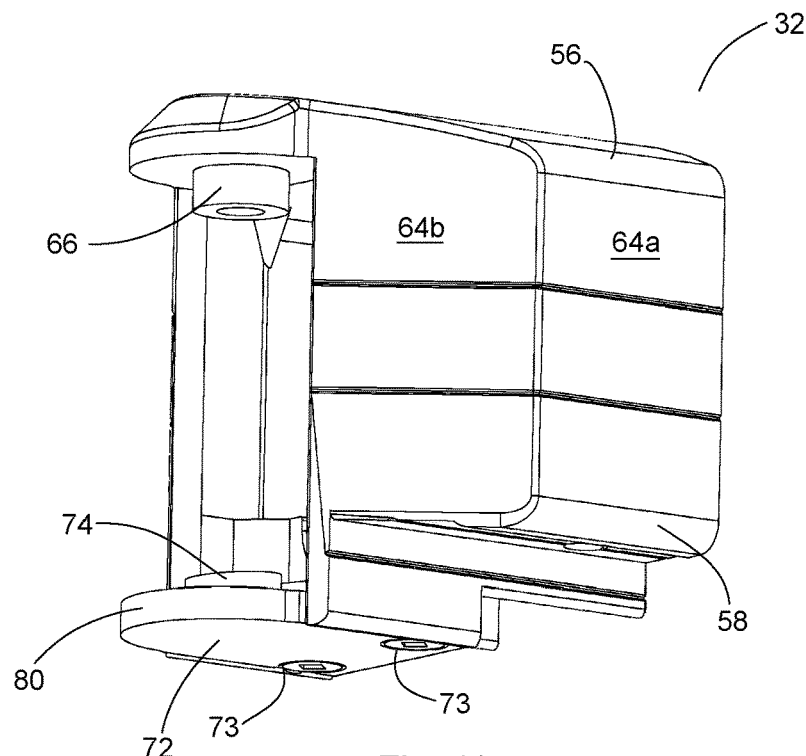
FIG. 11 is another perspective view of the first receiving portion and the first base of FIG. 9.
Figure 12:
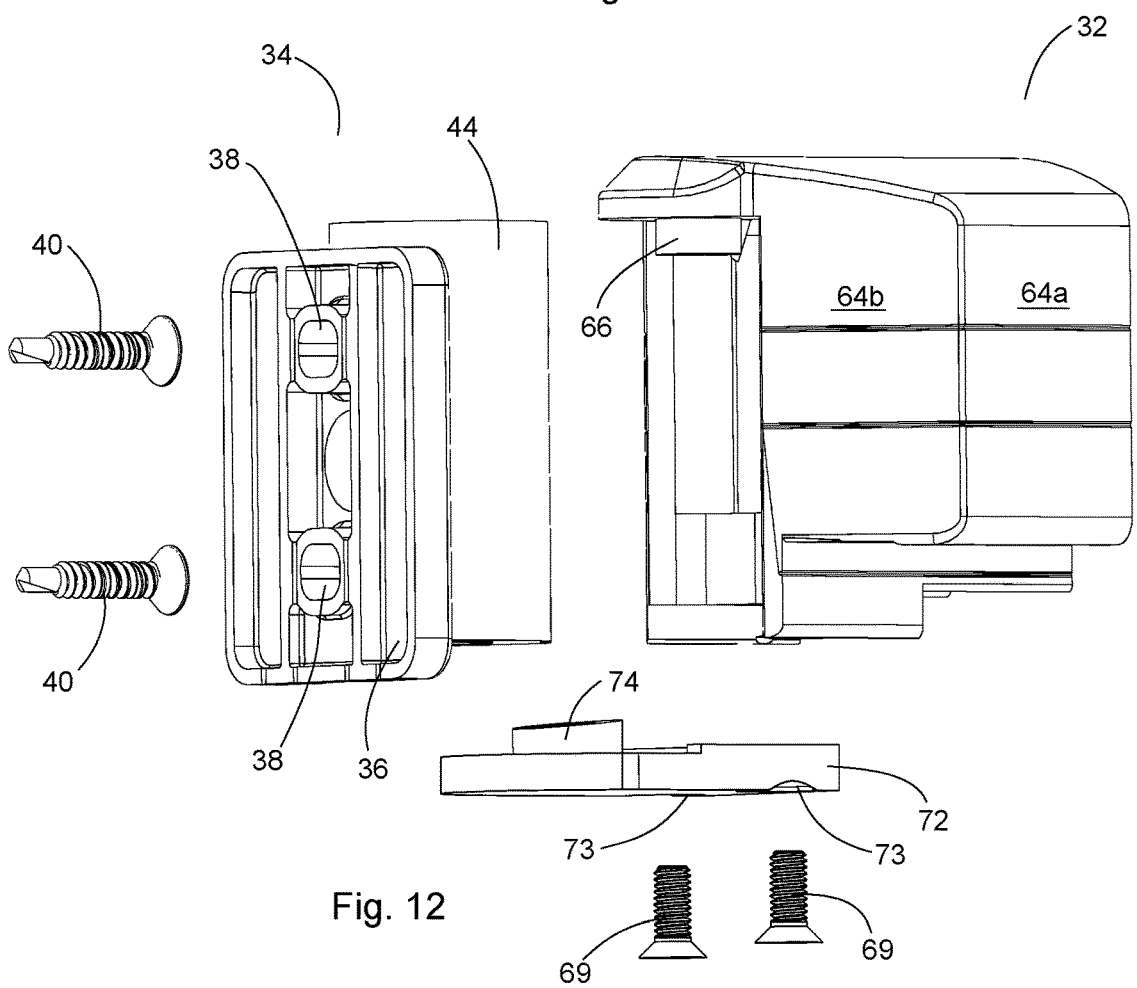
FIG. 12 is an exploded view of the first bracket.
Figure 13:
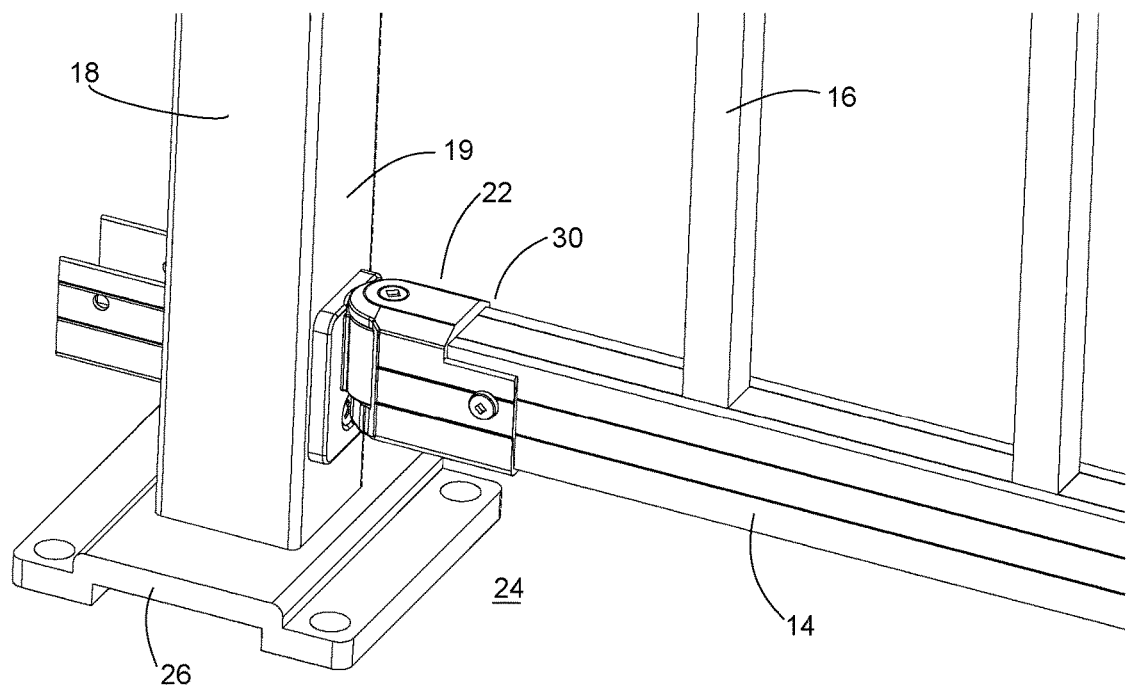
FIG. 13 is a magnified view of a portion of the railing system of FIG. 1, depicting, among other things, the second bracket.
Figure 14:
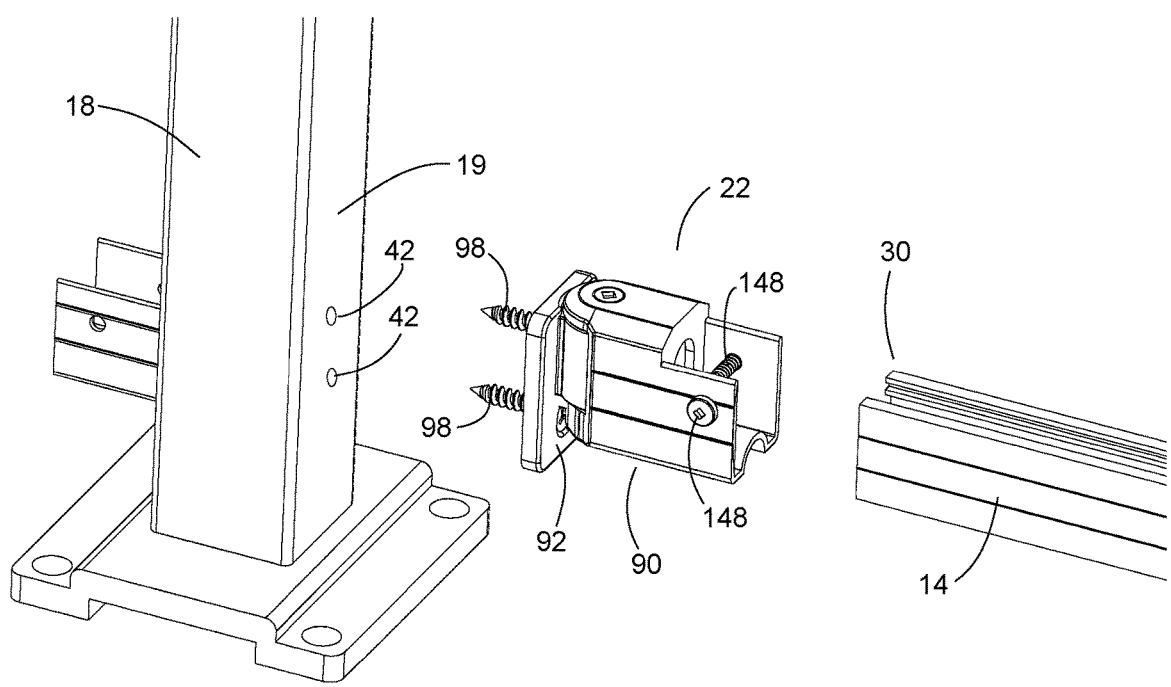
FIG. 14 is an exploded view of the portion of the railing system shown in FIG. 13.
Figure 15:
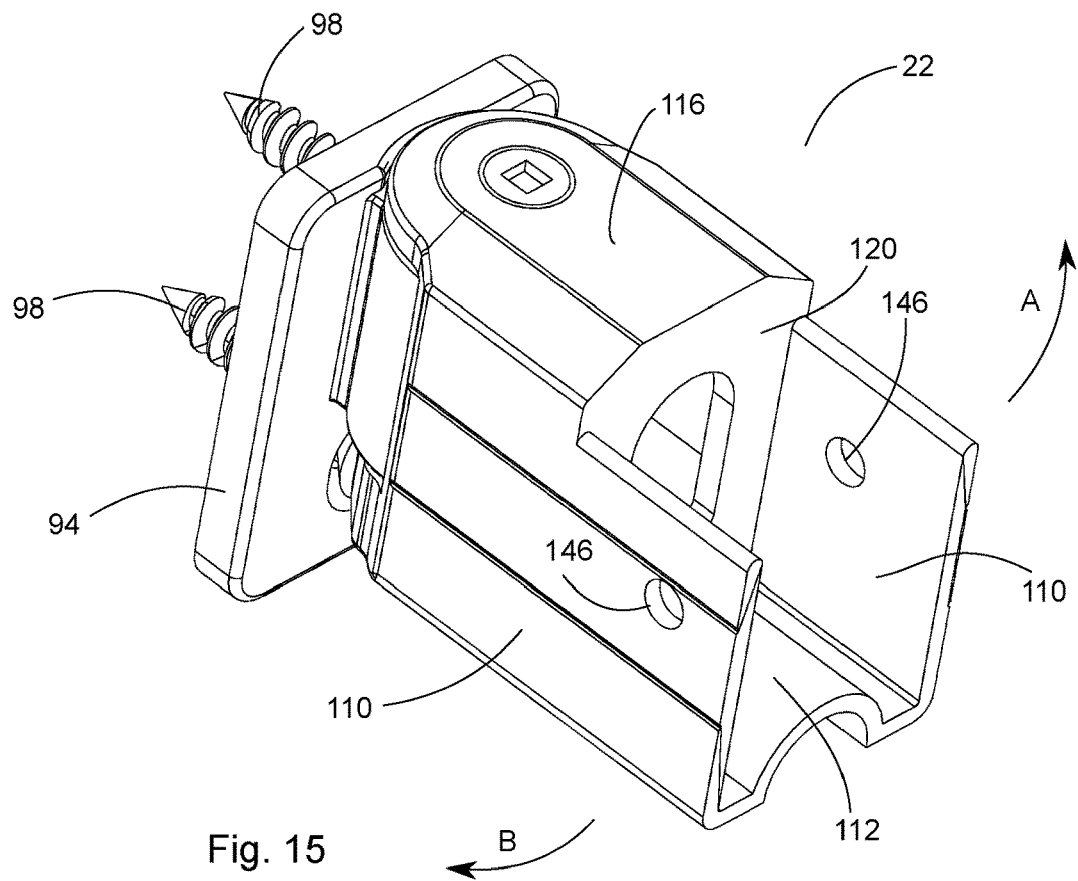
FIG. 15 is a perspective view of the second bracket of FIG. 13.
Figure 16:
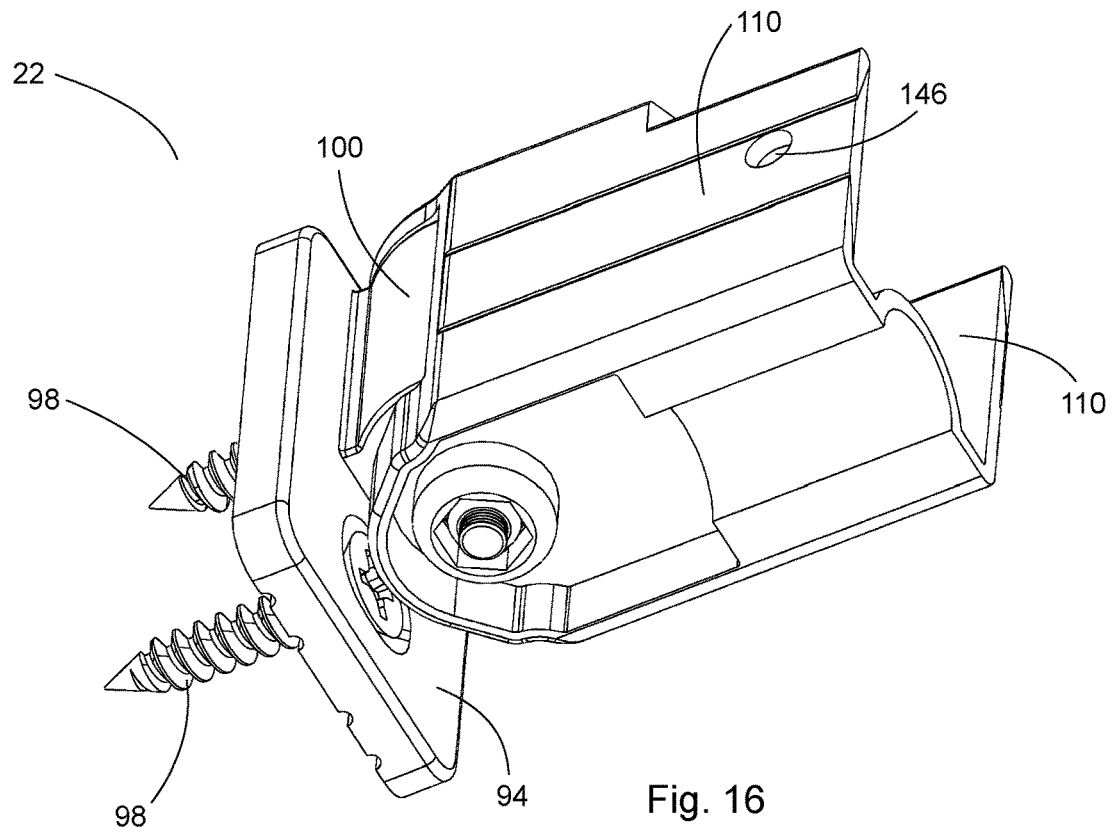
FIG. 16 is another perspective view of the second bracket of FIG. 13.

Referring to FIGS. 9 to 11, the first receiving portion 32 comprises a pair of first sidewalls 54, with each of the first sidewalls 54 comprising first upper and lower edges 56, 58. The first receiving portion 32 further comprises a first cover 60 preferably extending between the first upper edges 56 of the first sidewalls 54. The first receiving portion 32 also comprises first lower members 62 that extend inwardly from the first lower edges 58 of the first sidewalls 54. The first sidewalls 54, the first cover 60, and the first lower members 62 generally define a configuration that corresponds to and engages with one of the rail ends 30 of the first rail 12. In particular, the rail end 30 of the first rail 12 may be inserted, at least partially, within the first receiving portion 32.

In one embodiment, the first sidewalls 54 may angle inwards, as best shown in FIG. 10. In this embodiment, each of the first sidewalls 54 comprises first sidewall portions 64a, 64b that are angled with respect to each other. The first sidewall portions 64a are substantially parallel to each other and the first sidewall portions 64b are angled inwardly (towards the first pivot member 44). As shown in FIG. 9, although the sidewall portions 64b are angled inwardly towards each other, the sidewall portions 64b do not meet, instead preferably leaving a gap between them.

The first cover 60 comprises a downwardly extending first cover protrusion 66 that is adapted to fit within the first upper opening 50 of the first pivot member 44. Preferably, the first cover protrusion 66 is generally circular in cross-section. This allows the first cover protrusion 66 to rotate within the first upper opening 50, thereby allowing the first receiving portion 32 to pivot with respect to the first pivot member 44 (in directions A and B). Furthermore, the angle between the first receiving portion 32 and the first pivot member 44 can be adjusted (e.g. through the pivoting movement) such that the first rail 12 (when inserted into the first receiving portion 32) does not necessarily need to be perpendicular to the post surface 19. This allows for greater flexibility when installing the first rail 12 into the railing system 10. In one embodiment, the angle that the first rail 12 forms with the post surface 19 may be up to 45 degrees away from perpendicular.

Referring to FIG. 9, the first receiving portion 32 may comprise a first support portion 68 extending between the first lower members 62. The first receiving portion 32 may also comprise first flanges 70 that extend downwardly from the first lower members 62. At least a portion of the first flanges 70 may also contact the first support portion 68.

The first bracket 20 also comprises a first base 72 that is preferably attached to the first support portion 68. For example, the first support portion 68 preferably comprises one or more first support openings 71 that are adapted to receive support fasteners 69 therethrough for securing the first base 72 to the first support portion 68. The first base 72 comprises first base openings 73 that are aligned with the first support openings 71. The first base openings 73 are also adapted to receive the support fasteners 69 therethrough. The support fasteners 69 may comprise screws, bolts, or the like.

The first base 72 preferably extends beyond the first support portion 68 such that at least a portion of the first base 72 engages the first pivot member 44. Preferably, the first base 72 comprises an upwardly extending first base protrusion 74 that is adapted to fit within the first lower opening 52 of the first pivot member 44. Preferably, the first base protrusion 74 is generally circular in cross-section. This allows the first base protrusion 74 to rotate within the first lower opening 52. The rotation of the first cover protrusion 66 and the first base protrusion 74 within the first upper opening 50 and the first lower opening 52, respectively, allows the first receiving portion 32 to pivot with respect to the first pivot member 44 (in directions A and B).

Figure 5:
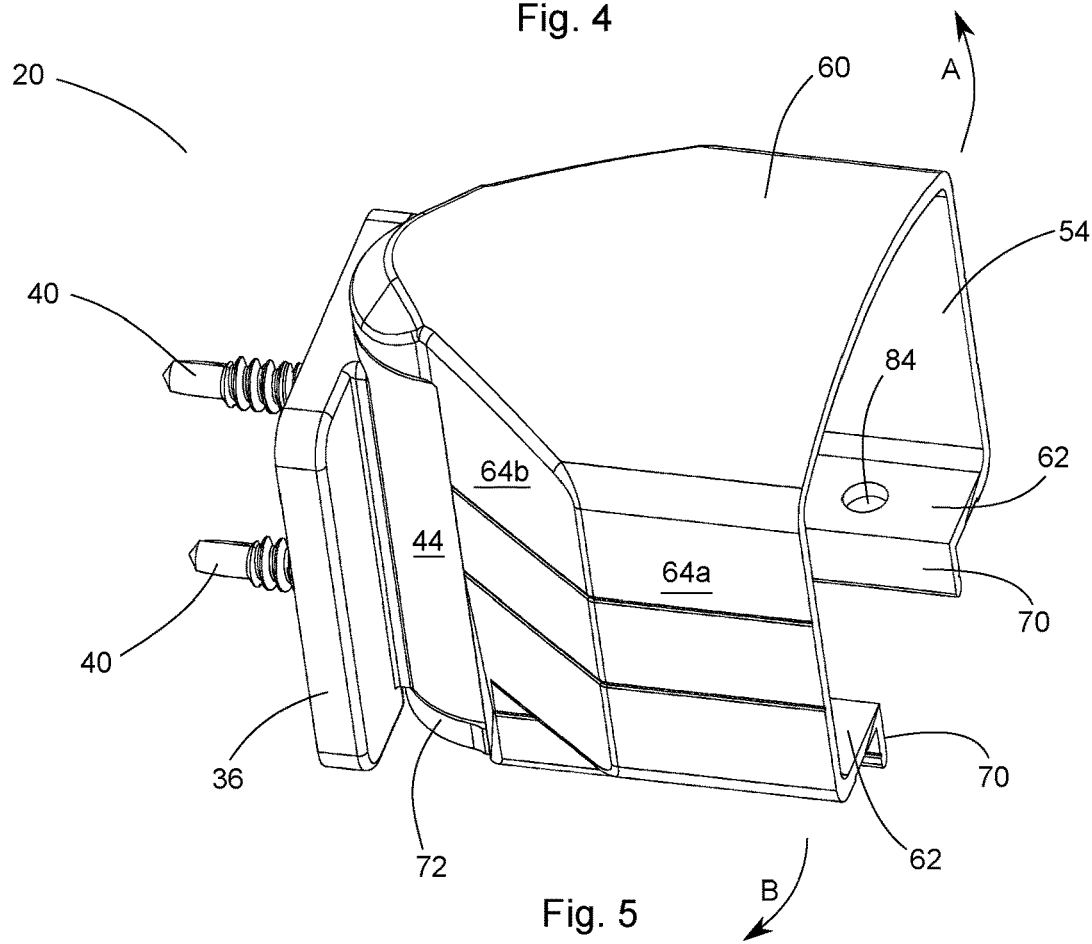
FIG. 5 is another perspective view of the first bracket of FIG. 2.

Referring to FIG. 5, the first base 72 is able to pivot with respect to the first pivot member 44. In order to facilitate this pivoting movement, the first base 72 preferably comprises a first base end 80 that is curved. In addition, the first plate 36 preferably comprises a first indent 82 (best seen in FIG. 8) to accommodate the first base end 80. Preferably, the first indent 82 is also curved such that when the first base 72 pivots with respect to the first pivot member 44, the first base end 80 is able to rotate within the first indent 82.

The engagement (and rotation) of the first cover protrusion 66 within the first upper opening 50 and the engagement of the first base protrusion 74 within the first lower opening 52 allow the first sidewalls 54 (and consequently the first receiving portion 32) to pivot about a longitudinal axis (defined by the line formed between the first upper opening 50 and the first lower opening 52) of the first pivot member 44. This pivoting of the first receiving portion 32 about the longitudinal axis of the first pivot member 44 allows the first receiving portion 32 to receive and engage the rail end 30 of the first rail 12 even if the first rail 12 meets the post surface 19 at an angle other than perpendicular.

Preferably, the first pivot member 44 comprises a first channel 76 that extends through the first pivot member 44 for at least a portion of the width and at least a portion of the height of the first pivot member 44. The first channel 76 allows for access to at least some of the first plate openings 38 so that the first plate 36 may be attached to the post surface 19 using the first post fasteners 40.

Referring to FIG. 9, the first support portion 68 preferably comprises a first support upper surface 78 that is contoured so as to not block access to the first channel 76 when the first receiving portion 32 is attached to the first pivot member 44.

The first lower members 62 preferably comprises one or more first lower member openings 84 that are adapted to receive first rail fasteners 86 therethrough for securing the first rail 12 to the first receiving portion 32. The first rail fasteners 86 may comprise bolts, screws, or the like.

Referring to FIGS. 13 to 23, the second bracket 22 comprises a second receiving portion 90 adapted to receiving and engage one of the rail ends 30 of the second rail 14. The second bracket 22 also comprises a second post attachment portion 92 adapted to be attached to the post 18. The second post attachment portion 92 comprises a second plate 94 that engages with the post surface 19. The second plate 94 preferably comprises one or more second plate openings 96 that are adapted to receive second post fasteners 98 therethrough for securing the second bracket 22 to the post surface 19. The post surface 19 may comprise post openings 42 that are aligned with the second plate openings 96 and that are also adapted to receive the second post fasteners 98 therethrough. The second post fasteners 98 may comprise bolts, screws, or the like.

Figure 17:
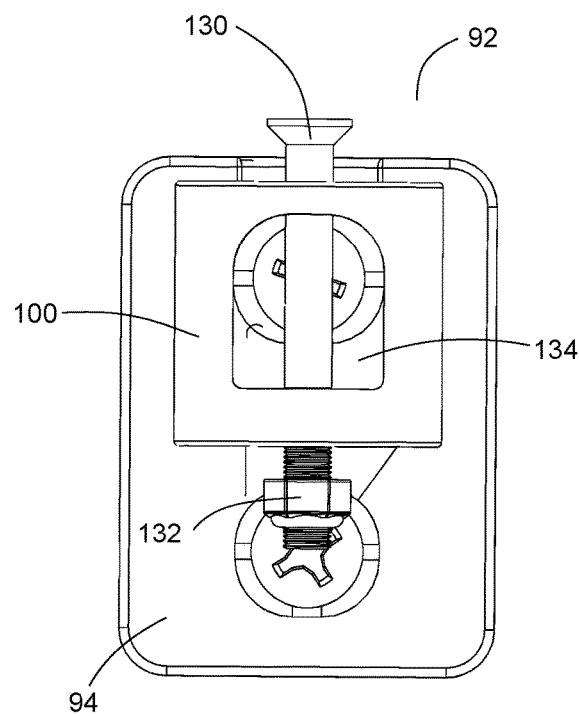
FIG. 17 is a front view of the second post attachment portion of the second bracket.
Figure 18:
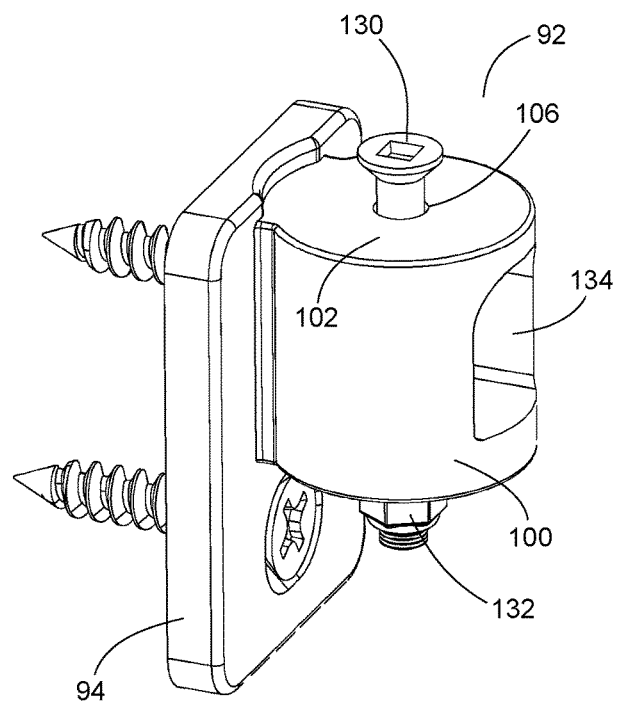
FIG. 18 is a perspective view of the second post attachment portion of FIG. 17.
Figure 19:
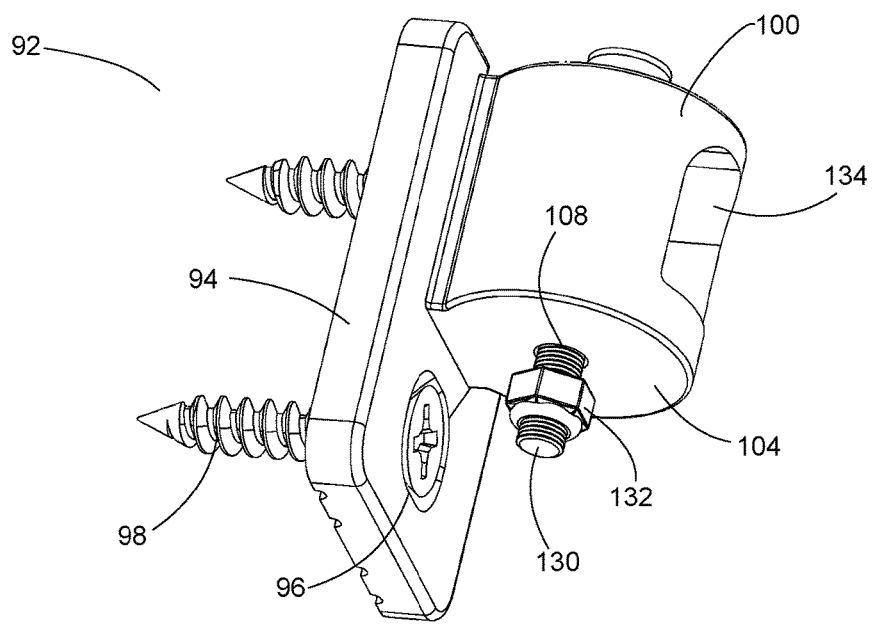
FIG. 19 is another perspective view of the second post attachment portion of FIG. 17.

Referring to FIGS. 17 to 19, the second post attachment portion 90 also comprises a second pivot member 100 extending from the second plate 94. Preferably, the second pivot member 100 is rigidly attached to the second plate 94. The second pivot member 100 may be generally tubular in shape and comprises second upper and lower surfaces 102, 104. A second upper opening 106 is formed on the second upper surface 102, while a second lower opening 108 is formed on the second lower surface 104. The second upper and lower openings 106, 108 are preferably substantially circular in shape and are preferably aligned with each other. The second pivot member 100 provides a base from which the second receiving portion 90 may pivot with respect to the second post attachment portion 92 (in directions A and B). Furthermore, the angle between the second receiving portion 90 and the second pivot member 100 can be adjusted (e.g. through the pivoting movement) such that the second rail 14 (when inserted into the second receiving portion 90) does not necessarily need to be perpendicular to the post surface 19. This allows for greater flexibility when installing the second rail 14 into the railing system 10. In one embodiment, the angle that the second rail 14 forms with the post surface 19 may be up to 45 degrees away from perpendicular.

Preferably, the angle formed between the first rail 12 and the post surface 19 is the same as the angle formed between the second rail 14 and the post surface 19, such that the first and second rails 12, 14 extend substantially parallel to each other.

Figure 20:
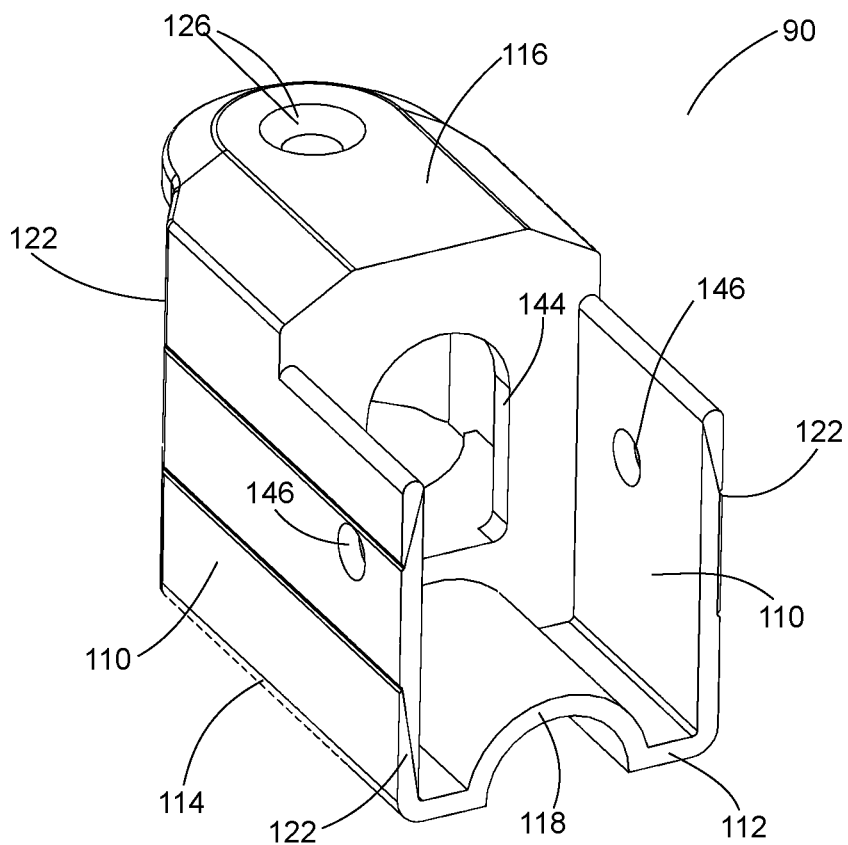
FIG. 20 is a perspective view of the second receiving portion of the second bracket.
Figure 21:
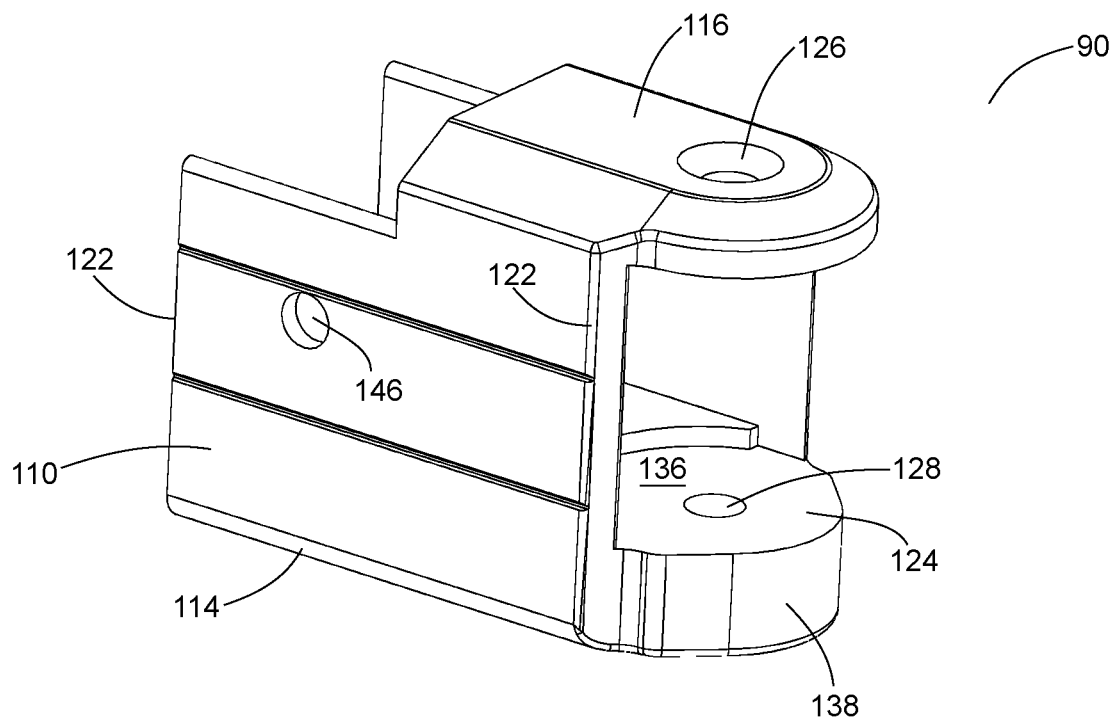
FIG. 21 is another perspective view of the second receiving portion of FIG. 20.
Figure 22:
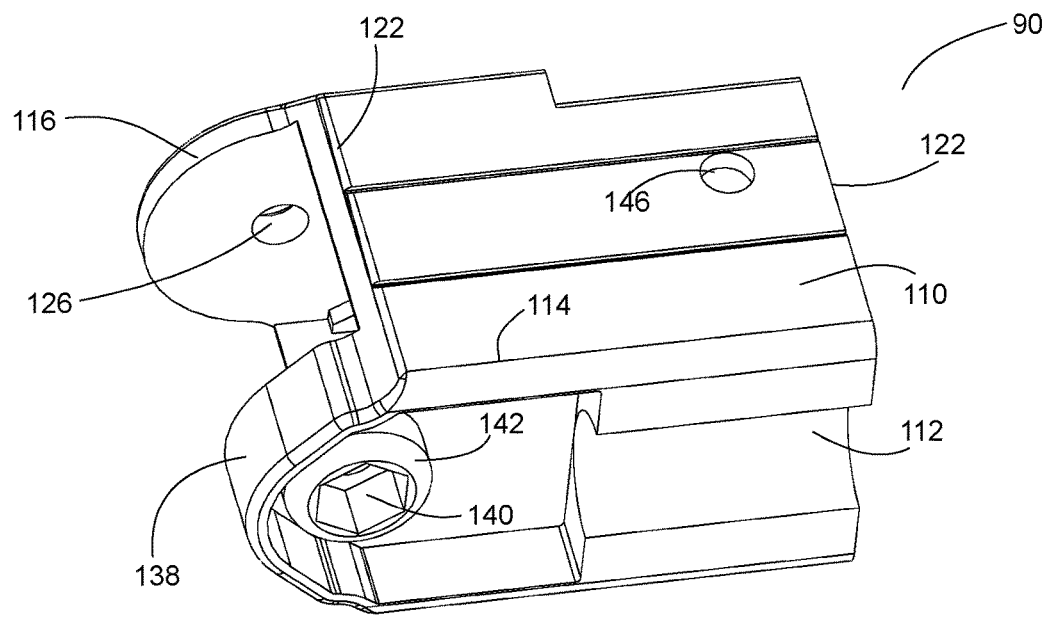
FIG. 22 is yet another perspective view of the second receiving portion of FIG. 20.
Figure 23:
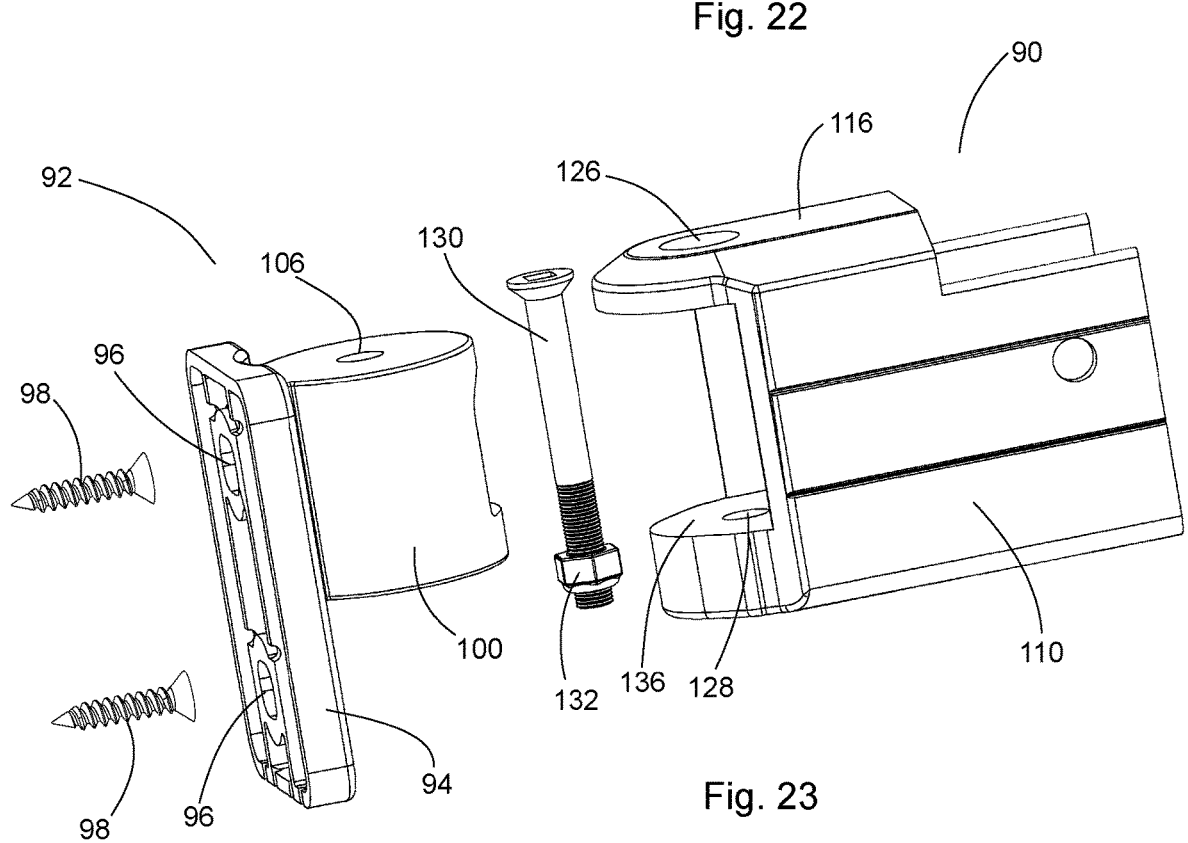
FIG. 23 is an exploded view of the second bracket.

Referring to FIGS. 20 to 22, the second receiving portion 90 comprises a pair of second sidewalls 110, each of the second sidewalls comprising a second lower edge 114 and a pair of second lateral edges 122. The second receiving portion 90 further comprises a second lower member 112 extending between the second lower edges 114 of the second sidewalls 110. The second sidewalls 110 and the second lower member 112 generally define a configuration that corresponds to and engages with one of the rail ends 30 of the second rail 14. In particular, the rail end 30 of the second rail 14 may be inserted, at least partially, within the second receiving portion 90. In the embodiment shown in FIG. 20, the second lower member 112 comprises a curvature 118 that generally extends upward. The curvature 118 may be used to provide some support for the rail end 30 of the second rail 14.

The second receiving portion 90 further comprises a second cover 116 that extends between at least a portion of the second sidewalls 110. In addition, the second receiving portion 90 may comprise a wall 120 extending between the second sidewalls 110. The wall 120 preferably extends substantially perpendicularly from the second sidewalls 110 somewhere between the second lateral edges 122 of the second sidewalls 110. Preferably, the second lower member 112 extends between the second sidewalls 110 from one of the second lateral edges 122 to the wall 120. Furthermore, in the embodiment shown in FIG. 20, the second cover 116 extends between the second sidewalls 110 from the wall 120 towards and beyond the other one of the second lateral edges 122. In other words, the second cover 116 preferably extends beyond the second sidewalls 110. However, it is understood that it is also possible for the second cover 116 to extend on both sides of the wall 120.

Referring to FIG. 21, the second receiving portion 90 further comprises a second base 124. Preferably, the second base 124 extends between the second sidewalls 110 away from the wall 120 (in the opposite direction as the second lower member 112). The second base 124 may extend beyond the second sidewalls 110.

The second cover 116 comprises a second cover opening 126, while the second base 124 comprises a second base opening 128. Preferably, the second cover opening 126 and the second base opening 128 are substantially circular. The second cover opening 126, the second upper opening 106, the second lower opening 108, and the second base opening 128 are preferably aligned, such that a pin 130 is able to extend therethrough. The engagement of the pin 130 through the second cover opening 126, the second upper opening 106, the second lower opening 108, and the second base opening 128 allow the second receiving portion 90 to pivot about a longitudinal axis (defined by the line formed between the second upper opening 106 and the second lower opening 108) of the second pivot member 100. This pivoting of the second receiving portion 90 about the longitudinal axis of the second pivot member 100 allows the second receiving portion 90 to receive and engage the rail end 30 of the second rail 14 even if the second rail 14 meets the post surface 19 at an angle other than perpendicular.

In the embodiment shown in FIGS. 17 to 19, the pin 130 is a threaded screw. A nut 132 may also be used in conjunction with the pin 130 in order to secure the pin 130 in place within the second bracket 22. For example, the pin 130 may be inserted through the second cover opening 126, the second upper opening 106, the second lower opening 108, and the second base opening 128 through the top, with the nut 132 being inserted onto the pin 130 from the bottom afterwards. The nut 132 will therefore engage the second base 124 and when further tightened, will secure the pin 130 in place and may assist in preventing further pivoting of the second receiving portion 90 with respect to the second pivot member 100.

Preferably, the second pivot member 100 comprises a second channel 134 that extends through the second pivot member 100 for at least a portion of the width and at least a portion of the height of the second pivot member 100. The second channel 134 allows for access to at least some of the second plate openings 96 so that the second plate 94 may be attached to the post surface 19 using the second post fasteners 98.

Referring to FIGS. 21 and 22, the second base 124 comprises a raised base upper surface 136 and a base side surface extending generally downwardly for at least a portion of the base upper surface 136. The second base opening 128 is formed on the base upper surface 136, with the second base opening 128 leading to a base passageway 140 generally defined by a passageway wall 142. The passageway wall 142 extends generally downwardly from the base upper surface 136. The passageway wall 142 provides for additional strength and rigidity to the second receiving portion 90 while it is pivoting about the second pivot member 100. Similarly, the second cover 116 may have a thickness greater than that of the second sidewalls 110, again to provide for additional strength and rigidity to the second receiving portion 90 while pivoting about the second pivoting member 100.

The wall 120 may comprise a wall opening 144 that is at least partially aligned with the second channel to allow for access to at least some of the second plate openings 96.

The second sidewalls 110 preferably comprises one or more second sidewall openings 146 that are adapted to receive second rail fasteners 148 therethrough for securing the second rail 14 to the second receiving portion 90. The second rail fasteners 148 may comprise bolts, screws, or the like.

Assembly of the railing system 10 will now be described. Two of the posts 18 are attached to the surface 24 through the respective post bases 26. The first post attachment portions 34 are attached to the post surfaces 19 using the first post fasteners 40. The first receiving portions 32 are then fitted over the rail ends 30 of the first rail 12. The first rail 12 is pushed into each of the first receiving portion 32 until the rail end 30 contacts the first sidewall portions 64b. Using the first rail fasteners 86, the first rail 12 is secured to both of the first receiving portions 32. The first cover protrusions 66 of each of the first receiving portions 32 are then inserted into the first upper openings 50 of the first pivot members 44. Because of the pivotability of the first receiving portion 32 with respect to the first pivot member 44, the first rail 12 does not necessarily have to be at 90 degrees to the post surface 19. The first base protrusions 74 are inserted into the first lower openings 52, and the first base openings 73 are aligned with the first support openings 71 (for each of the first brackets 20). The first bases 72 are then secured to the first support portions 68 using the support fasteners 69. Because of the pivotability of the first receiving portion 34 with respect to the first post attachment portion 34, a variety of angles between the first rail 12 and the post surface 19 may be accommodated.

For the second rail 14, the second post attachment portions 92 are attached to the post surfaces 19 for each of the posts 18. The second receiving portions 90 are inserted over each of the rail ends 30 of the second rail 14, until the rail ends 30 contact the walls 120. Each of the second receiving portions 90 are then aligned with one of the second post attachment portions 92. The pins 130 are then inserted, thereby securing the second post attachment portions 92 to the second receiving portions 90. Similarly, because of the pivotability of the second receiving portion 90 with respect to the second post attachment portion 92, a variety of angles between the second rail 14 and the post surface 19 may be accommodated. The angle between the second rail 14 and the post surfaced 19 does not necessarily have to be 90 degrees.

It will be appreciated by those skilled in the art that the preferred embodiment has been described in some detail but that certain modifications may be practiced without departing from the principles of the invention.

The invention claimed is:
1. A railing system comprising:
first and second rails;
one or more posts, each of the one or more posts comprising a post surface;
a first bracket connecting the first rail to one of the one or more posts, the first bracket comprising:
   a first plate adapted to be attached to the post surface;
   a first pivot member extending from and attached to the first plate, the first pivot member comprising first upper and lower surfaces, wherein the first upper surface comprises a first upper opening and the first lower surface comprises a first lower opening, and wherein the first upper opening and the first lower opening are aligned;
   a first receiving portion adapted to receive one end of the first rail, the first receiving portion comprising first sidewalls and a first cover, wherein the first cover comprises a first cover protrusion adapted to engage with the first upper opening; and
   a first base connected to the first receiving portion, the first base comprising a first base protrusion adapted to engage with the first lower opening;
   wherein the first receiving portion and the first base are adapted to pivot about a longitudinal axis of the first pivot member to adjust a first angle between the first rail and the post surface; and
a second bracket connecting the second rail to the one of the one or more posts, the second bracket comprising:
   a second plate adapted to be attached to the post surface;
   a second pivot member extending from and attached to the second plate, the second pivot member comprising second upper and lower surfaces, wherein the second upper surface comprises a second upper opening and the second lower surface comprises a second lower opening;
   a second receiving portion adapted to receive one end of the second rail, the second receiving portion comprising second sidewalls, a second cover, and a second base, wherein the second cover comprises a second cover opening and the second base comprises a second base opening, and wherein the second cover opening, the second upper opening, the second base opening, and the second lower opening are substantially aligned; and
   a pin extending through the second cover opening, the second upper opening, the second base opening, and the second lower opening;
   wherein the second receiving portion is adapted to pivot about a longitudinal axis of the second pivot member to adjust a second angle between the second rail and the post surface.

2. The railing system of claim 1, wherein the second plate comprises one or more second plate openings adapted to receive second post fasteners therethrough for attaching the second plate to the post surface.

3. The railing system of claim 1, wherein the first upper opening and the first lower opening are circular in shape.

4. The railing system of claim 1, wherein the second cover opening, the second upper opening, the second base opening, and the second lower opening are circular in shape.

5. The railing system of claim 1, wherein each of the first sidewalls comprise two sidewall portions, wherein the two sidewall portions are angled with respect to each other.

6. The railing system of claim 1, wherein the first receiving portion further comprises first lower members extending from the first sidewalls, the first lower members comprising first lower member openings adapted to receive first rail fasteners therethrough for attaching the first receiving member to the first rail.

7. The railing system of claim 6, wherein the first sidewalls, the first cover, and the first lower members are adapted to receive the one end of the first rail.

8. The railing system of claim 1, wherein the second receiving portion further comprises a second lower member, wherein the second sidewalls and the second lower member are adapted to receive the one end of the second rail.

9. The railing system of claim 8, wherein the second receiving portion further comprises a wall, wherein the wall extends substantially perpendicularly to the second sidewalls and wherein the wall extends between the second base and the second lower member.

10. The railing system of claim 9, wherein the second pivot member comprises a second channel extending therethrough, wherein the second channel provides access to at least one of the second plate openings.

11. The railing system of claim 10, wherein the wall comprises a wall opening, wherein the wall opening is at least partially aligned with the second channel to provide access to at least one of the second plate openings.

12. The railing system of claim 1, wherein the first angle and the second angle are substantially similar.

13. A bracket for connecting a rail to a post surface, the bracket comprising:
- a plate adapted to be attached to the post surface;
- a pivot member extending from and attached to the plate, the pivot member comprising upper and lower surfaces, wherein the upper surface comprises an upper opening and the lower surface comprises a lower opening and wherein the upper opening and the lower opening are aligned;
- a receiving portion adapted to receive the rail, the receiving portion comprising sidewalls and a cover, wherein the cover comprises a cover protrusion adapted to engage with the upper opening; and
- a base connected to the receiving portion, the base comprising a base protrusion adapted to engage with the lower opening;
- wherein the receiving portion and the base are adapted to pivot about a longitudinal axis of the pivot member to adjust an angle between the rail and the post surface.

14. The bracket of claim 13, wherein the plate comprises one or more plate openings adapted to receive post fasteners therethrough for attaching the plate to the post surface.

15. The bracket of claim 14, wherein the pivot member comprises a channel extending therethrough, wherein the channel provides access to at least one of the plate openings.

16. The bracket of claim 13, wherein the cover protrusion extends downwardly and fits within the upper opening.

17. The bracket of claim 13, wherein the base protrusion extends upwardly and fits upwardly and fits within the lower opening.

18. The bracket of claim 13, wherein each of the sidewalls comprise two sidewall portions, wherein the two sidewall portions are angled with respect to each other.

19. The bracket of claim 13, wherein the receiving portion further comprises lower members extending from the sidewalls, the lower members comprising lower member openings adapted to receive rail fasteners therethrough for attaching the receiving member to the rail.

20. The bracket of claim 19, wherein the receiving portion further comprises a support portion extending between the lower members.

21. The bracket of claim 20, wherein the base is connected to the support portion.

22. The bracket of claim 19, wherein the sidewalls, the cover, and the lower members are adapted to receive the one end of the rail.

* * * * *